(12) United States Patent
Valov et al.

(10) Patent No.: US 8,627,730 B2
(45) Date of Patent: Jan. 14, 2014

(54) TORQUE SENSOR WITH U-PROFILE WEB

(75) Inventors: Petar Valov, Schwäbisch Gmünel (DE);
Rainer Schwafertz, Remscheid (DE);
Hans-Joachim Mehlau, Solingen (DE)

(73) Assignee: Eduard Wille GmbH & Co. KG, Wuppertal (DE)

( * ) Notice: Subject to any disclaimer, the term of this patent is extended or adjusted under 35 U.S.C. 154(b) by 230 days.

(21) Appl. No.: 13/134,548

(22) Filed: Jun. 8, 2011

(65) Prior Publication Data
US 2011/0303020 A1    Dec. 15, 2011

(30) Foreign Application Priority Data

Jun. 10, 2010    (DE) .............. 20 2010 005 613 U

(51) Int. Cl.
*G01L 3/16*    (2006.01)

(52) U.S. Cl.
USPC ................... 73/862.09; 73/862.044

(58) Field of Classification Search
USPC .............. 73/862.21, 862.09, 862.041–46
See application file for complete search history.

(56) References Cited

U.S. PATENT DOCUMENTS

| | | | | | |
|---|---|---|---|---|---|
| 3,771,359 | A | * | 11/1973 | Shoberg | 73/862.044 |
| 4,555,207 | A | * | 11/1985 | Ferguson | 411/6 |
| 5,894,094 | A | * | 4/1999 | Kuchler et al. | 73/862.044 |
| 6,269,702 | B1 | * | 8/2001 | Lambson | 73/862.045 |
| 6,871,552 | B2 | * | 3/2005 | Liu et al. | 73/862.041 |
| 7,104,144 | B1 | * | 9/2006 | Hsieh | 73/862.21 |
| 7,287,439 | B2 | * | 10/2007 | Chen et al. | 73/862.21 |
| 7,392,712 | B2 | * | 7/2008 | Hsieh | 73/862.21 |
| 2004/0003646 | A1 | * | 1/2004 | Herbold et al. | 73/1.12 |
| 2004/0007082 | A1 | * | 1/2004 | Herbold | 73/862.046 |

FOREIGN PATENT DOCUMENTS

EP    1353159    10/2003

* cited by examiner

*Primary Examiner* — Max Noori
(74) *Attorney, Agent, or Firm* — Lawrence G. Fridman

(57) ABSTRACT

The invention relates to a torque sensor comprising an inner body, an outer annular body surrounding the inner body concentrically and webs connecting the inner body to the outer annular body in a star shape. Further on the torque sensor comprises a means for introducing torque and at least one measuring element on a web for determining deformation. The webs have the form of a u-profile.

17 Claims, 4 Drawing Sheets

TORQUE SENSOR WITH U-PROFILE WEB

FIELD OF THE INVENTION

The invention generally relates to sensors and in particular it relates to torque sensors.

BACKGROUND OF THE INVENTION

Torque sensors are sensors that determine torque by deformation of a measuring body. Most torque sensors operate with strain gauges. There are also torque sensors, which operate on the piezoelectric, the magneto-elastic or the optical principle.

Torque sensors are used on rotating or stationary shafts for the determination of the transmitted torque, but also in calibrating devices for torque wrenches. For short build and very stiff tools to be calibrated, such as torque wrenches, often so-called torque measurement flanges are used. The torque measurement flanges as generic torque sensors consist of an inner hub that is connected by several spokes to an outer ring. The spokes wear sensors, such as strain gauges that measure the bending load at an applied torque. In such torque sensors the influence of lateral forces and lateral moments should be compensated as far as possible. Moreover, the torque sensor should be characterized by low mass moment of inertia and high measuring sensitivity.

With a torque sensor according to the German patent DE 42 08 522 C2 not bending forces, but shear forces are measured. To this end the torque sensor has an inner body or inner hub and a concentric outer annular body. The inner body is connected to the outer annular body by webs extending in star shape. The measuring sensors, for example strain gauges are seated on the webs for the detection of torsion.

In the German patent application DE 195 25 231 A1 a torque sensor is described, which consists of two opposing flanges that are interconnected by webs. Strain gauges are provided on the connecting webs. The cost of this variant of torque sensors are also relatively high. In addition, the dynamic behavior of such torque sensors is very inadequate. A further disadvantage of the torque sensor described therein is, that a shift of the zero point still occurs at high rotation speeds, and that the manufacturing costs of such torque sensors are extremely high.

DE 202 09 850 U1 discloses a torque sensor with webs and having an inner body and an outer annular body concentrically surrounding the inner body. Webs with different widths connect the inner body with the annular body in a star shape. Measuring elements, which are provided on the webs, determine the torsion of the webs generated by an applied torque.

A disadvantage of the aforementioned torque sensors is that the manufacturing cost of the torque sensors is correlated with their accuracy.

Thus, it has been long felt and unsolved need to create a torque sensor, which eliminates the disadvantages of the above-mentioned state of the art and is designed as cost-effective and simple as possible and yet sensitive and accurate.

SUMMARY OF THE INVENTION

The present invention relates to a torque sensor comprising an inner body, an outer annular body surrounding the inner body concentrically, webs connecting the inner body to the outer annular body in a star shape, means for introducing torque, and at least one measuring element on a web for determining deformation, wherein the webs have the form of a u-profile.

In one embodiment of the invention the u-profiles have the ratio of width of the u-profile to height of the u-profile from 1 to 1.5. With this ratio, a high bending rigidity and low impact of lateral forces on the measuring elements is achieved.

As to another aspect of the invention it is advantageous to arrange the u-profiles in the ratio of torque sensor radius to web center radius from 1.5 to 2.5 relative to the center of the torque sensor. This avoids torque peaks and distributes the introduced force homogeneous.

As to another aspect of the invention, u-profiles are provided having different thickness in height and/or width. This allows more variability in statics and weight distribution of the webs, so an improved measurement result of the torque senor is achieved.

As to still another aspect of the invention, the measuring elements are respectively arranged at the u-profiles. By this measure, the torsion or deformation can be measured particularly well when torque is applied, to the torque sensor.

As to a still further aspect of the invention the torque sensor comprises a polygon socket. The polygon socket form-fittingly receives an outer polygon of a torque wrench during the measurement.

As to still another aspect of the present invention, the measuring element is a strain gauge. By the strain gauge the deformation is particularly easy detectable.

Further modifications, advantages and features of the present invention become apparent from the subject matter of the claims, as well as the drawings with the corresponding description.

BRIEF DESCRIPTION OF THE DRAWINGS

Exemplary embodiments of the invention will be now described in greater detail herein below with reference to the accompanying drawings, in which.

DETAILED DESCRIPTION OF THE INVENTION

The invention is based on the principle that lateral forces and torque forces, which are applied to the torque sensor by the force introduction, are optimally distributed to the webs with the measuring elements for detecting deformation. It is essential that the u-profile has a very high resistance to lateral forces, so that the webs obtain a local stability and the effects of lateral forces are radically minimized during the measurement. In this manner, the number of webs can be reduced, because each web on its own is formed considerably more stable.

In one embodiment of the invention the torque sensor is provided in the form of a polygon socket. The polygon socket form-fittingly receives an outer polygon of a torque wrench during the measurement.

The polygon socket comprises a cut-out on its surfaces, which receives, for example, a spring-loaded ball of an outer polygon of a torque wrench. The cut-out effectuates a free centering of the outer polygon in the polygon socket. In this way measuring errors, which result from centering errors, are significantly reduced, because lateral forces are extensively eliminated.

To improve the dynamic behavior the masses of the inner body and the outer body are different. This is achieved, for example, by the inner body and the outer annular body having different volumes or different density. Due to the different moments of inertia, which are present because of the different densities, additional adjustable parameters are obtained for improving the accuracy of the torque sensor. In a suitable embodiment, the outer annular body has a larger mass than the inner body. This is particularly advantageous when the inner body and the outer annular body have different densities, particularly when the outer annular body has a greater density than the inner body. Thus, the torque sensor obtains a different moment of inertia in the inner body than in the outer annular body, which leads to an improvement of the dynamic behavior of the torque sensor.

It is advantageous to provide a torque sensor with a plurality of u-profiles in general, and with two to four u-profiles in particular. By the number of webs the ratio of stiffness and elastic deformation can be influenced and the torque sensor can be excellently adapted to different use cases. Normally, the influence of lateral forces increases when reducing the number of webs.

The effect of lateral forces is compensated by the u-profiles, which have a particularly high resistance to such forces, so that the number of webs can be reduced while maintaining the accuracy during the measurement process. Moreover, by reducing the webs to two u-profiles, a lower-cost production of the torque sensor is achieved.

Figure 1:
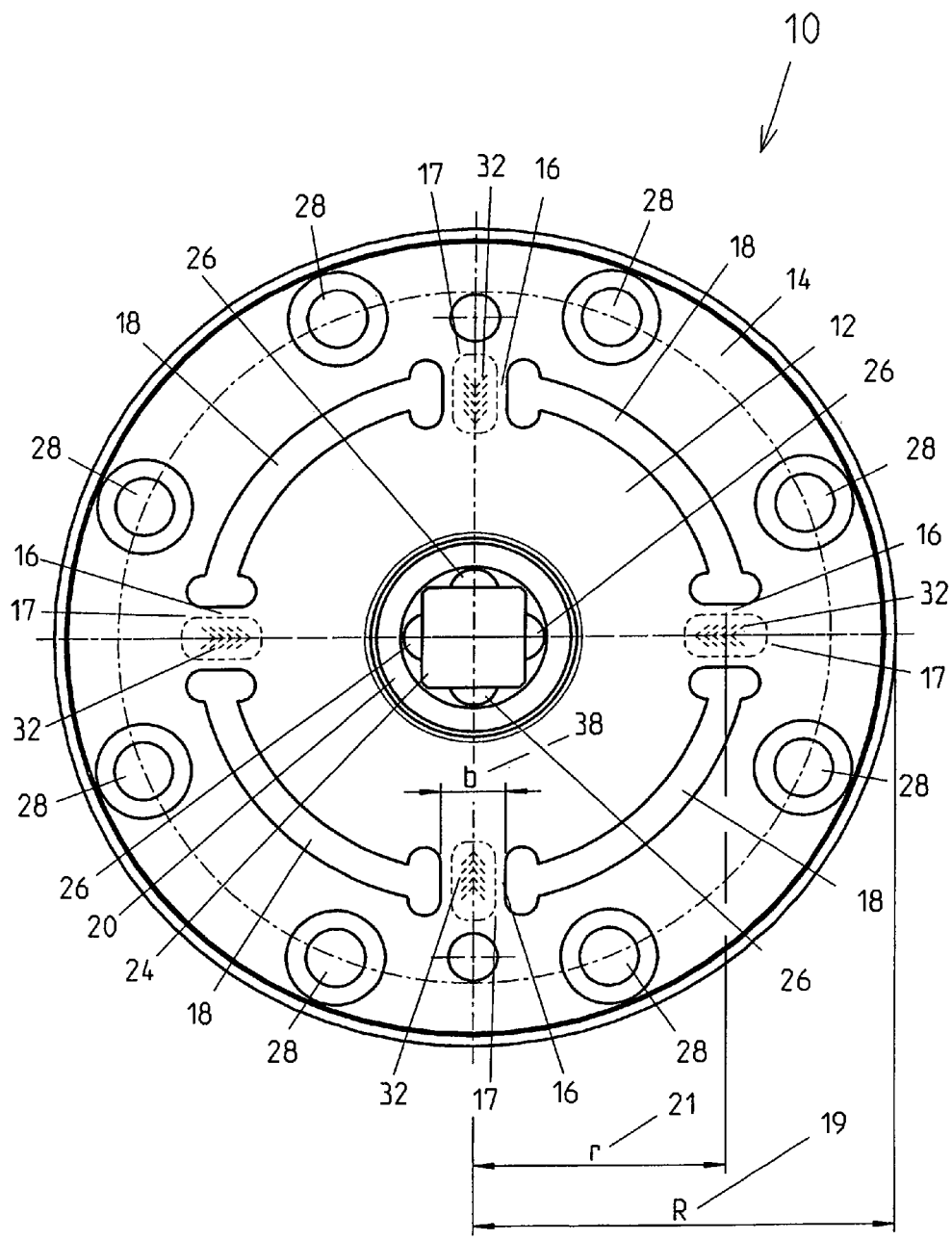
FIG. 1 is a schematic front view of a torque sensor according to the invention.

Referring now to the drawings in general, and to FIG. 1 in particular, which shows a front view of a torque sensor 10. The torque sensor 10 comprises an inner body 12 which is surrounded by an outer annular body 14. The inner body 12 is connected to the outer ring body 14 by radial extending webs 16. The webs 16 are formed u-shaped as u-profiles 17. The webs 16 connect the inner body 12 to the outer annular body 14, wherein in this exemplary embodiment the intermediate space 18 has the shape of a ring segment with rounded end regions.

In the center of the inner body 12 of the torque sensor 10, a pin 20 is visible, which is provided with a countersink 22 and a recess 24. In this exemplary embodiment, the recess 24 is formed as a square socket. Further on, a cut-out 26 is located on the surfaces of the square socket in form of a semi-circular cutout to receive, for example, a spring-loaded ball or pin of the external square of a torque wrench. Usually the torque wrench has a spring-loaded ball or pin on its external square, which moves in when receiving a tool and is pressed against the square socket of the insert during the engagement. This leads to a connection of torque wrench and insert or torque sensor and ensures optimum force introduction during the measurement process.

Other through holes 28 in the outer annular body 14 have a structural and weight reducing function or can be screwed to according shaft flanges, in order to transfer torque.

At the u-profiles 17 measuring elements 32 are provided for detecting the deformation of the webs 16. Preferably, these measuring elements 32 are strain gauges, which provide an electrical signal corresponding to the deformation to an evaluation device, not shown. By appropriately applying a torque to the torque sensor 10, the forces are optimally distributed to the webs 16. To this end, the u-profile 17 eliminates lateral forces caused by clamping and twisting of the torque wrench, which can occur when the torque is introduced. These forces are compensated directly at the measuring element by the legs of the u-profile 17.

Preferably, a strain gauge with two measuring grids is attached to each u-profile 17, wherein the grid angle is 45° relative to the longitudinal axis of the web. (The strain gauges are shown schematically.) A very high output signal is obtained when the measuring elements are connected into a Wheatstone measuring bridge. If the torque sensor 10 is subject to an applied torque a shear load in circumferential direction can be determined with high sensitivity by the arrangement of the strain gauges.

The inner body 12 has a smaller mass than the outer annular body 14. This is, for example, created by materials of different density.

FIG. 1 also illustrates the different ratios R/r of torque sensor radius 19 to web center radius 21. For additional stability optimization of the torque sensor, the ratio is 1.5 to 2.5.

Figures 2, 5:
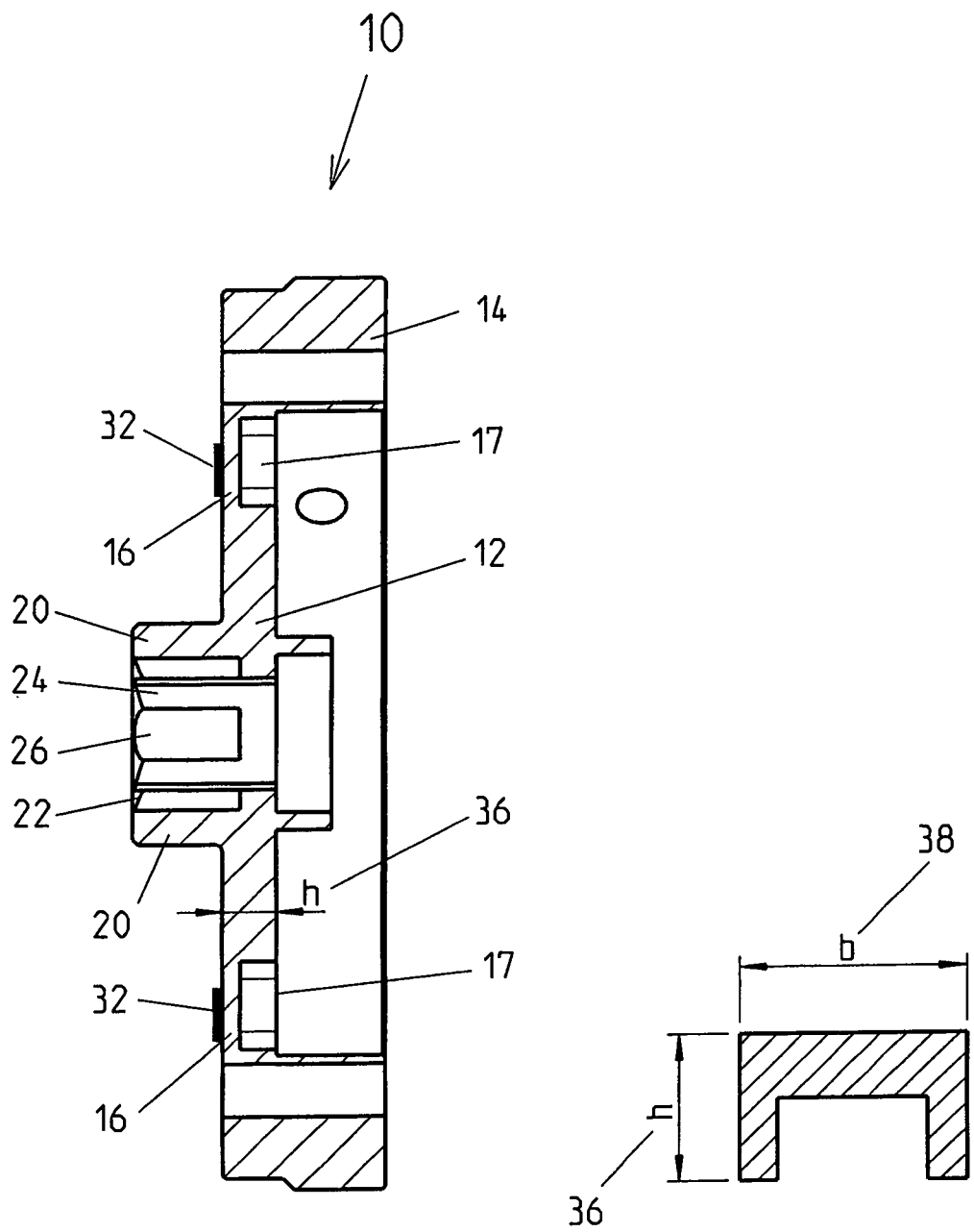
FIG. 2 is a schematic cross section view through the torque sensor.
FIG. 5 is a schematic cross-section view of a u-profile.

FIG. 2 shows a schematic cross section through the torque sensor 10. The section plane is located in the region of the webs 16. The figure shows the relatively simple assembling of the torque sensor 10, which comprises the outer annular body 14 and the inner body 12. The measuring elements 32 are located on the u-profiles 17 of the webs 16. In doing so, a cost-effective production of the torque sensor 10 is given, since complex milling or drilling is not necessary. Furthermore, the pin 20, the countersink 22, the recess 24 and the cut-out 26 for receiving the spring-loaded ball of the torque wrench are visible. The height 36 and width 38 (FIG. 5) of the u-profiles are shown in FIG. 2.

Figure 3:
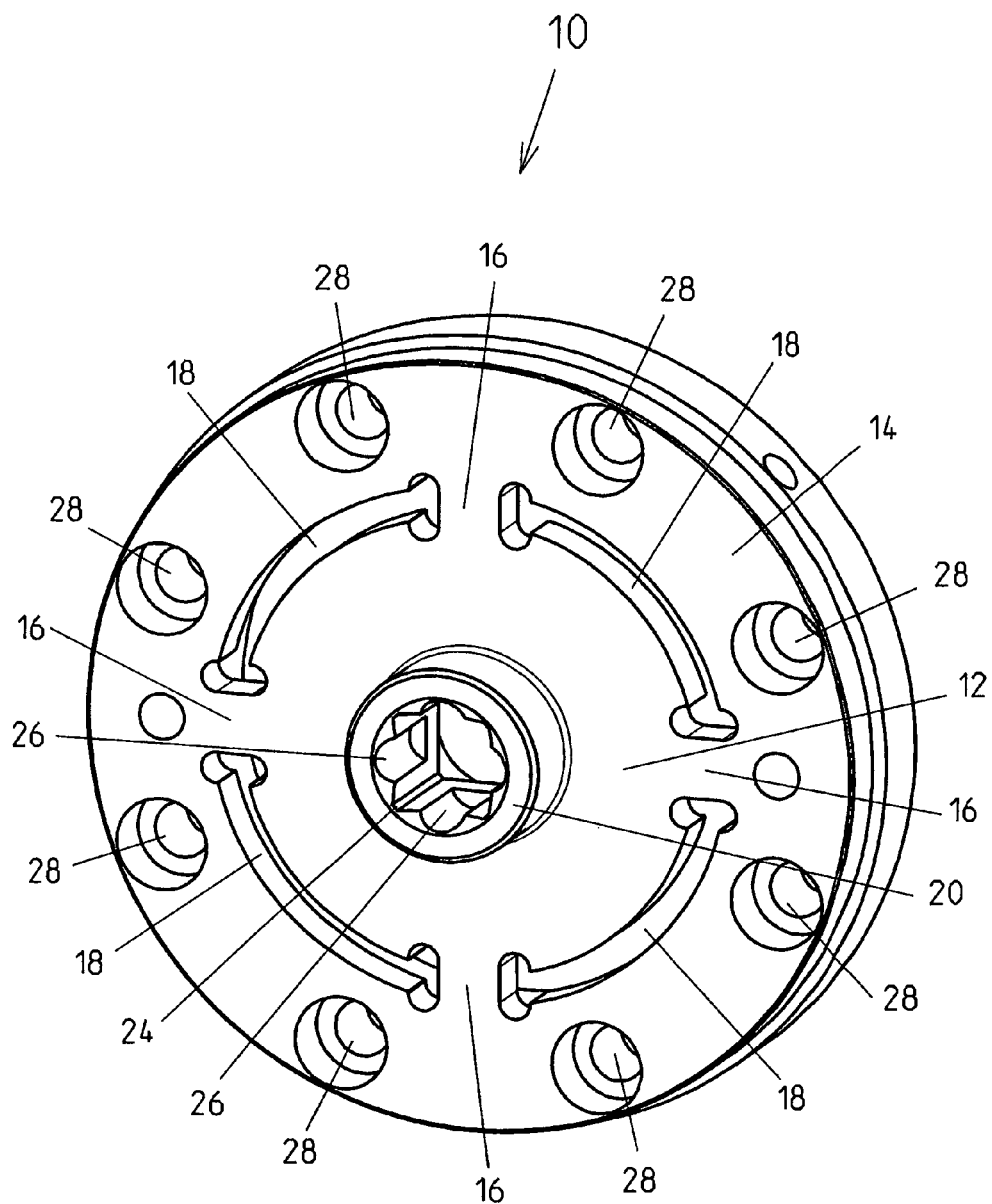
FIG. 3 is a schematic three-dimensional view of the front of the torque sensor.
Figure 4:
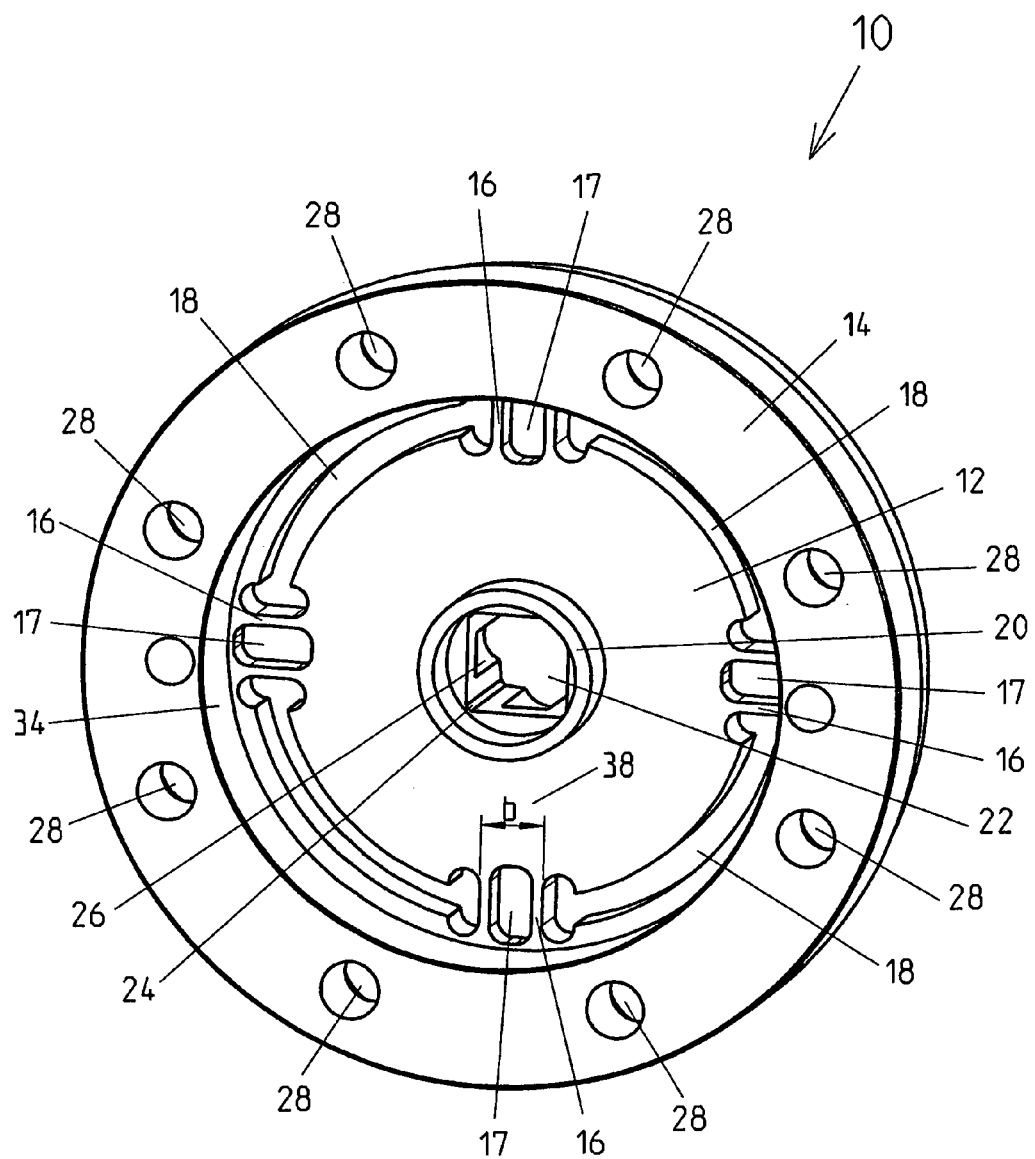
FIG. 4 is a schematic three-dimensional view of the rear of the torque sensor.

From the perspective view of the torque sensor 10 in FIG. 3 (front view) and FIG. 4 (rear view) more details are visible. The contours of the u-profiles 17 are particularly well visible on the rear side (FIG. 4) of the torque sensor 10. In contrast, the measuring elements 32 are arranged on the front side of the torque sensor 10.

The three-dimensional view further shows that the intermediate spaces 18 which have the shape of a ring segment with rounded end regions are continuous. In this way, in particular a weight reduction of the inner body 12 is possible. It is shown in at least FIGS. 3 and 4 that each intermediate space 18 is formed as a narrow circumferential slot extending along the outer circumferential periphery of the inner body. The narrow circumferential slots are separated from a central socket by a substantial uninterrupted area of the inner body.

The three-dimensional view further shows that the intermediate spaces 18 which have the shape of a ring segment with rounded end regions are continuous. In this way, in particular a weight reduction of the inner body 12 is possible.

FIG. 5 shows a cross section through the u-profile 17. The u-profile 17 has different thicknesses at its height 36 and/or width 38. In doing so, a notable stability, flexural strength and shear strength of the webs 16 is assured, because the width of the u-profile 17, i.e. the extension in the circumferential direction, and the height, i.e. the extension in the axial direction, is provided in the ratio b/h from 1 to 1.5. This induces an additional variability in statics and weight distribution of the torque sensor.

What is claimed is:

1. A torque sensor comprising:
  a circular-shaped inner body;
  an outer annular body concentrically surrounding the inner body;
  a plurality of webs connecting the inner body with the outer annular body in a star shape formation;
  an arrangement for introducing torque;
  each said web having at least one measuring element for detecting deformation;

each said web having u-shaped profile;
a central socket extends outwardly from a central area of the inner body, said socket formed with a semi-circular cutout in the vicinity of a top portion thereof; and
a plurality of separated from each other intermediate spaces provided at an outer periphery of the inner body, each said intennediate space being formed as a narrow circumferential slot extending along the outer circumferential periphery of the inner body, said narrow circumferential slots are separated from said central socket by a substantial uninterrupted area of the inner body.

2. A torque sensor according to claim 1, wherein the u-shaped profiles have a ratio of width of the u-profile to height of the u-profile ranging between 1 and 1.5.

3. A torque sensor according to claim 1, wherein the u-shaped profiles are arranged in the ratio of torque sensor radius to web center radius ranging between 1.5 and 2.5 relative to the center of the torque sensor.

4. A torque sensor according to claim 1, wherein the u-shaped profiles have different thicknesses in height and/or width.

5. A torque sensor according to claim 1, wherein the measuring elements are respectively arranged at the u-shaped profiles.

6. A torque sensor according to claim 1, wherein each said narrow circumferential slot extends along about one quarter of the circular outer periphery of the inner body.

7. A torque sensor according to claim 1, wherein said inner body being substantially wider than the outer annual body.

8. A torque sensor according to claim 1, wherein the inner body and the outer annular body have different mass.

9. A torque sensor according to claim 1, wherein the outer annular body has a greater mass than the inner body.

10. A torque sensor according to claim 1, wherein an interior area of said central socket is formed by a rectangular-shaped recess with substantially flat inner walls, semi-cylindrical cavities extend inwardly into a body of the socket from said inner walls.

11. A torque sensor according to claim 1, wherein the measuring element is a strain gauge.

12. A torque sensor according to claim 1, wherein the inner body and the outer annular body have different densities.

13. A torque sensor according to claim 1, wherein the outer annular body has a greater density than the inner body.

14. A torque sensor according to claim 3, wherein the ratio of width of the u-profile to the height of the u-profile ranges between 1 and 1.2; and the ratio of torque sensor radius to the web center radius ranges between 1.6 and 2.2.

15. A torque sensor according to claim 1, wherein to achieve weight reduction of the inner body each said narrow slot is formed as a continuous segment passing through entire thickness of the inner body.

16. A torque sensor according to claim 1, wherein settling influence of the torque arrangement is reduced due to increase of a clamping surface of a flange in comparison with conventional torque sensors.

17. A torque sensor according to claim 1, wherein said webs are formed between end regions of the narrow circumferential slots.

* * * * *